United States Patent [19]

Martchenke

[11] 4,006,071
[45] Feb. 1, 1977

[54] ACCUMULATOR PROGRAM FOR ELECTROPLATING ENERGY

[76] Inventor: Earl J. Martchenke, 3405 Sinton Road, Colorado Springs, Colo. 80907

[22] Filed: May 19, 1975

[21] Appl. No.: 578,381

[52] U.S. Cl. .................................. 204/228; 204/109
[51] Int. Cl.² .................... C25C 1/22; C25D 3/46
[58] Field of Search .............. 204/228, 109, 275

[56] References Cited

UNITED STATES PATENTS

| | | | |
|---|---|---|---|
| 1,900,893 | 3/1933 | Hickman | 204/238 |
| 3,418,225 | 12/1968 | Wick et al. | 204/228 |
| 3,524,805 | 8/1970 | Engelman | 204/109 |
| 3,616,412 | 10/1971 | Gnage | 204/228 |
| 3,616,435 | 10/1971 | Favell et al. | 204/228 |

*Primary Examiner*—T. M. Tufariello
*Attorney, Agent, or Firm*—Richard W. Hanes

[57] ABSTRACT

A time accumulator control for an electrolytic process including an on/off control for the electrolytic current generator which is operated by an accumulator for multiplying the time duration of a given input signal.

1 Claim, 1 Drawing Figure

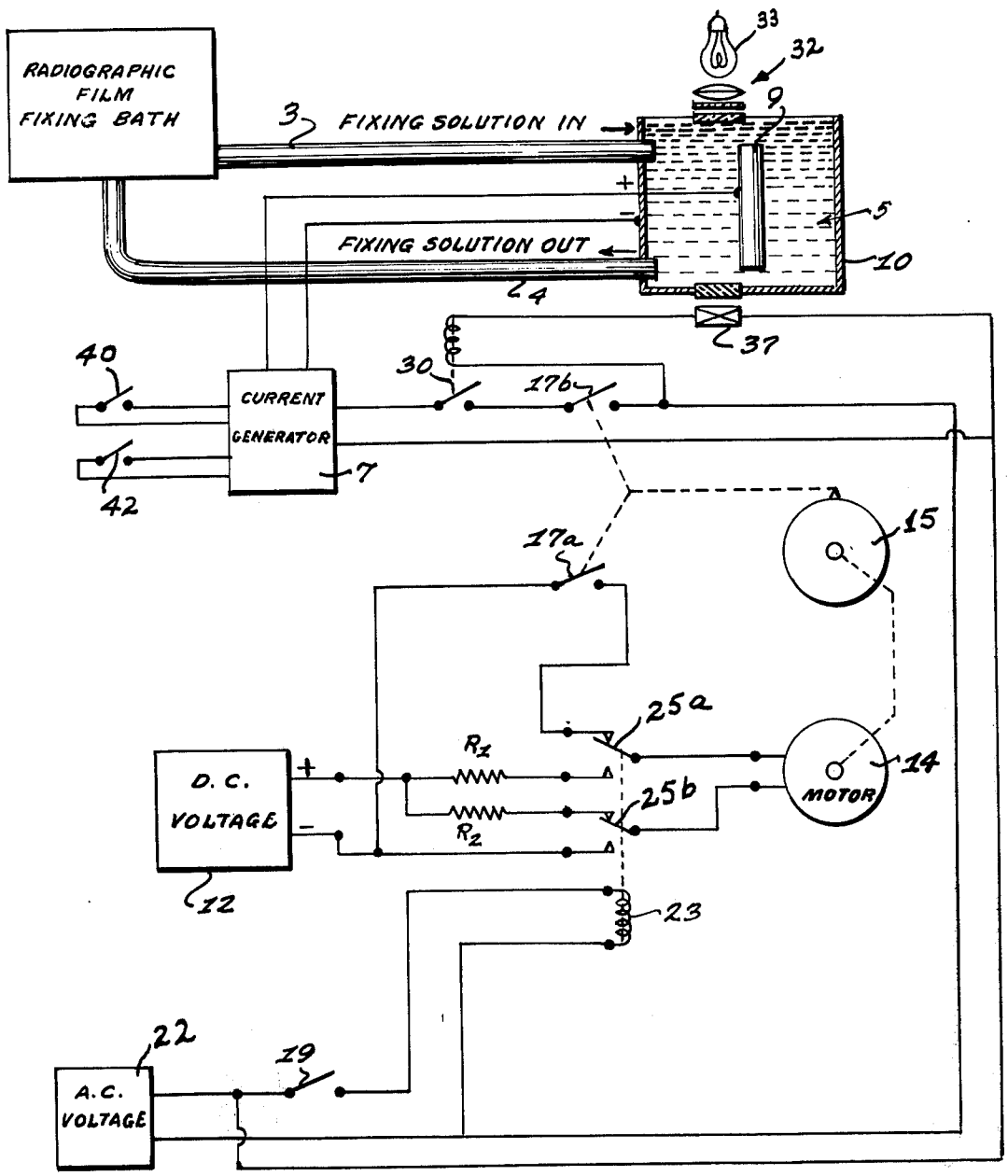

ACCUMULATOR PROGRAM FOR ELECTROPLATING ENERGY

BACKGROUND OF THE INVENTION

It is economically and ecologically desireable to recover metallic elements from solution baths, such as photographic and radiographic fixing solutions. An example of a device for accomplishing such recovery is described in U.S. Pat. No. 3,694,341, issued Sept. 26, 1972. It consists generally of a container whose outer wall is a cylindrical cathode and which has an anode suspended centrally thereof. Electrical current is passed between the anode and cathode through the fixing solution causing silver or other metallic material in solution in the fluid to be deposited on the cathode by electrolysis.

While the electric current passing through the fluid produces an electrolytic deposition of metal on the cathode, it can also cause a ruinous change in the chemistry of the solution, depending on the amperage and time of current flow. For this reason, it is important to control the electric current so as not to damage fixing solutions with resultant destruction of film. In most applications of metallic recovery devices, proper control has not been available primarily because the solutions being treated are grossly variable in their amount of metallic content over a given period of time. In the prior art, in order to insure protection of the solution from a damaging chemical change, a "low profile" current regime was used where a constant low current was applied based on average free silver production per time period or film increment. Since the efficiency of the electrolysis is a function of higher currents, it is apparent that conservative current levels established for protection of the chemistry of the fixing solution results in low metallic recovery efficiency.

It is the primary object of the present invention to provide a control system for the application of current to a metallic recovery device to control the current level as a function of metallic content of the solution and hence increase the efficiency of metal recovery.

Another object of the invention is to provide a control system such as the one described which will protect the solution from damagingg chemical change.

Other objects will become apparent upon reading of the following detailed description of a preferred form of the invention taken together with the accompanying drawing in which:

FIG. 1 is a diagrammatic view of an electrolytic metal recovery system working in connection with a radiographic film fixing bath for recirculation of the fixing solution and a schematic diagram of the electrolytic current control system of the present invention.

FIG 1 illustrates a typical installation of an on-line silver recovery system where a photographic or radiographic film fixing tank is provided with circulating conduits 3 and 4 through which the silver bearing fixing solution is passed to an electrolytic plating device 5 and returns silver-free solution to the fixing tank. A current generator 7 is provided between the anode 9 and the cathode 10 of the plating device 5. The control system of the present invention controls the current flow to the plating device as a function of the area of the film being treated in the film processing unit, a part of which is the fixing bath.

in photographic and radiographic film processing units, the amount of silver which goes into solution in the process chemicals is substantially proportional to the total area of processed film, there being an average amount of exposure area over a large number of films. If the average exposure area is taken as a constant, free silver deposition into the processing chemistry varies linearly with the total area of film processed. In any processing device, such as medical x-ray processing unit, if the width of all film is the same, the area of the film varies only as a function of the linear inches or feet of film processes. If the width of films is not constant, a second variable needs to be added in order to arrive at a relationship between time and film area.

In the electrolytic process of the present invention, the amount of electrolytic current and time of its application are proportioned to the total film area of processed film in order to provide the desired high efficiency results. It is not possible to plate out the silver from a fixing solution at the same rate that the silver is deposited. For example, a 90-second medical x-ray processing unit generates free silver at a rate in excess of 0.002 troy ounces per second while a typical electrolytic plating unit operating at 10 amperes is capable of plating only 0.0003 troy ounces per second.

Before proceeding to a fuller description of the invention, limitations of electrolytic current should be understood. Sulphur containing fixing solutions will respond to an electric current passing therethrough. In this sulphate, for example, a current of 23 amperes will randomly plate silver and sulphur with equal ease. Lesser amounts of current will tend to plate only the silver and leave the sulphur. The latter is the desireable action because plating out the sulphur will destroy the fixing solution and ruin any film with which it comes into contact. It is also true that if high amounts of current are allowed to pass through the solution after the silver has been plated out, the sulphur will then be involved in the electrolytic action, causing damage to the chemistry.

In order to apply maximum current to the electrolysis recovery system and hence achieve a high efficiency of silver recovery, the current should be applied only for that time which is necessary to plate the silver which is in solution.

To accomplish this purpose, the present invention utilizes an accumulator to measure the length (related to area) of film being processed and then applies a given electrolysis current for the required time to treat the measured amount of film. Assuming for purposes of this explanation that the silver generation - silver deposition time ratio were found to be 1:5, the voltages mentioned below would apply, however other ratios can be used.

A D.C. voltage source 12 is connected through appropriate relay contacts 25a and 25b to the input terminals of a variable speed D.C. motor 14. The motor 14 drives a disc 15 or other appropriate switch activator which is operatively connected to a pair of switches 17a and 17b which are both open when the motor is at a quiesant or "at rest" neutral position, but closed all other times.

The film processor unit is provided with an electric switch 19 which is responsive to the insertion into the processor of a film. The switch 19 remains closed during the time the film passes between a pair of rollers. Switch 19 is connected in series between a power source 22 and an electromagnetic relay coil 23. During the closure of the processor switch 19, the relay 23 is picked up, causing switch 25a to complete the positive circuit to the motor 14 through dropping resistor R2. As the motor starts to turn clockwise, switches 17a and 17b close.

When the film has passed through the rollers, switch 19 opens, dropping the relay 23 and through the normally closed contacts of switch 25b, the positive voltage output is connected to the opposite terminal of the motor through a larger dropping resistor R2, causing it to run counter-clockwise at approximately one fifth of the speed at which it ran clockwise. During clockwise and counter-clockwise running of the motor 14, switch contacts 17b and 30 are closed, through which is suppled a control voltage for turning on the electrolysis current generator 7.

A fail safe color switch 30 is provided in series with the control voltage which is designed to open at such time as the color of the fixer bath starts to change, indicating potential damage to the solution chemistry. A lens and filter arrangement 32 directs light from a source 33 through the fluid in the plating container so as to impinge upon an appropriate interpretive photoelectric cell 37. Through well known electronic means, the color switch is kept closed so long as light is recieved by the photoelectric cell, however, when the solution is threatened and begins to turn color, the light transfer through the fluid is diminished and the color switch 30 is opened, turning off the electrolysis current.

The metal reclamation current will remain turned on so long as the color switch 30 is not opened and the switch 17b remains closed. When the accumulator motor 14 returns to its starting or quiesant position, the switch 17b will open, terminating the electrolysis current.

Where film length, as measured by switch 19, is a substantially accurate measurement of film area, one current can be employed for electrolysis, using time of application as the only variable. When films of varying widths are to be processed, however, greater efficiency demands a sensing of film width. In the same way as film switch 19 is activated, other switches 40 and 42 can be placed so as to be responsive to films of differing widths. Each of these switches 40 and 42 are connected to control the current generator so that the generator 7 will produce increased amounts of current when wider than normal films are processed, thus providing maximum current as a function of total film area.

It will be seen that the objects of the invention have been accomplished by control system of the present invention, it being understood that recovery of metal will take place during counter-clockwise rotation of the motor 14, while film "area" is being accounted for by the clockwise forward running of the motor 14.

I claim:

1. A time accumulator control for electrolytic process comprising:
   a current generator;
   electrolytic plating means including:
      a cathode forming tank,
      an anode disposed within said tank, said anode and cathode being electrically connected to the current generator;
   power means,
   means including first switch means interconnecting the power means and the current generator;
   time multiplying means operatively connected to the switch means and responsive to a first input signal of given time duration, which time multiplying means includes:
      a reversible motor having clockwise and counter-clockwise input terminals;
      a voltage source;
      voltage control means interconnecting the said voltage source and the motor, and
      a second switch means operatively connected to the voltage control means for applying a first voltage to the clockwise terminal of the motor and a second voltage to the counter-clockwise terminal of the motor;
   a first input signal of given time duration comprising:
      a voltage source,
      control means operatively connected to the voltage source, and
      means interconnecting the voltage source to the second switch means for operation thereof;
   third switch means operatively connected to the current generator for controlling the operation thereof,
   color sensing means, including a light source disposed and positioned so as to direct a beam of light through the said tank,
   photoelectric switching means disposed to receive the said light and operatively connected to the third switching means for controlling the operation thereof, and
   fourth switch means operatively connected to the current generator for controlling the current produced thereby, said switch means being responsive to a second input signal of given time duration.

* * * * *